United States Patent
Gray et al.

(10) Patent No.: US 8,412,852 B2
(45) Date of Patent: Apr. 2, 2013

(54) GUARANTEEING A SINGLE COPY OF A SHARED ASSEMBLY PER PROCESS

(75) Inventors: Michael Wallace Gray, Runaway Bay (AU); Alexander John Hennekam, Gold Coast (AU); Peter Reginald Horner, Varsity Lakes (AU); Simon David McMahon, Burleigh Waters (AU); Michael James Thomas, Bonogin (AU); Peter Thoedore Waltenberg, Robina (AU)

(73) Assignee: International Business Machines Corporation, Armonk, NY (US)

( * ) Notice: Subject to any disclaimer, the term of this patent is extended or adjusted under 35 U.S.C. 154(b) by 1093 days.

(21) Appl. No.: 12/366,041

(22) Filed: Feb. 5, 2009

(65) Prior Publication Data

US 2010/0199289 A1    Aug. 5, 2010

(51) Int. Cl.
*G06F 9/44* (2006.01)
*G06F 3/00* (2006.01)
(52) U.S. Cl. .................. 709/316; 719/331; 717/106
(58) Field of Classification Search ................... None
See application file for complete search history.

(56) References Cited

U.S. PATENT DOCUMENTS

| | | | | |
|---|---|---|---|---|
| 6,035,243 A * | 3/2000 | Galuga et al. | ................ | 700/110 |
| 6,327,594 B1 | 12/2001 | Van Huben et al. | | |
| 6,442,620 B1 * | 8/2002 | Thatte et al. | ................ | 719/316 |
| 6,442,748 B1 | 8/2002 | Bowman-Amuah | | |
| 6,912,606 B2 * | 6/2005 | Fay | ................ | 710/64 |
| 7,249,211 B2 * | 7/2007 | Wieland et al. | ................ | 710/269 |
| 7,437,718 B2 * | 10/2008 | Fournet et al. | ................ | 717/133 |
| 7,565,665 B2 * | 7/2009 | Forin et al. | ................ | 719/331 |
| 7,661,089 B2 * | 2/2010 | Cope et al. | ................ | 717/106 |
| 8,050,238 B2 * | 11/2011 | Harris | ................ | 370/335 |

* cited by examiner

*Primary Examiner* — Don Wong
*Assistant Examiner* — Mohammad Kabir
(74) *Attorney, Agent, or Firm* — Yes & Associates, P.C.; Yeen C. Tham

(57) ABSTRACT

A computer implemented method, computer program product, and a data processing system access a version of shared assembly in a componentized environment, wherein multiple versions of the shared assembly exist concurrently in a single process, and wherein each version of the shared assembly comprises an assembly stub and an assembly implementation. A call to an assembly stub of the shared assembly is received. The call is then forwarded from the assembly stub to an identified assembly implementation using a proxy pointer. A function table structure is then retuned from the identified assembly implementation, wherein the function table structure contains implementation symbols from the identified assembly implementation.

20 Claims, 5 Drawing Sheets

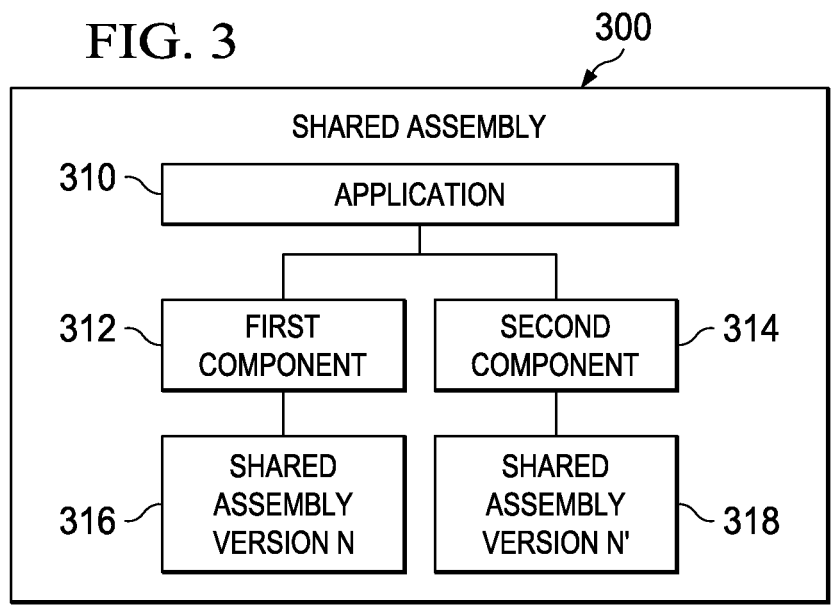
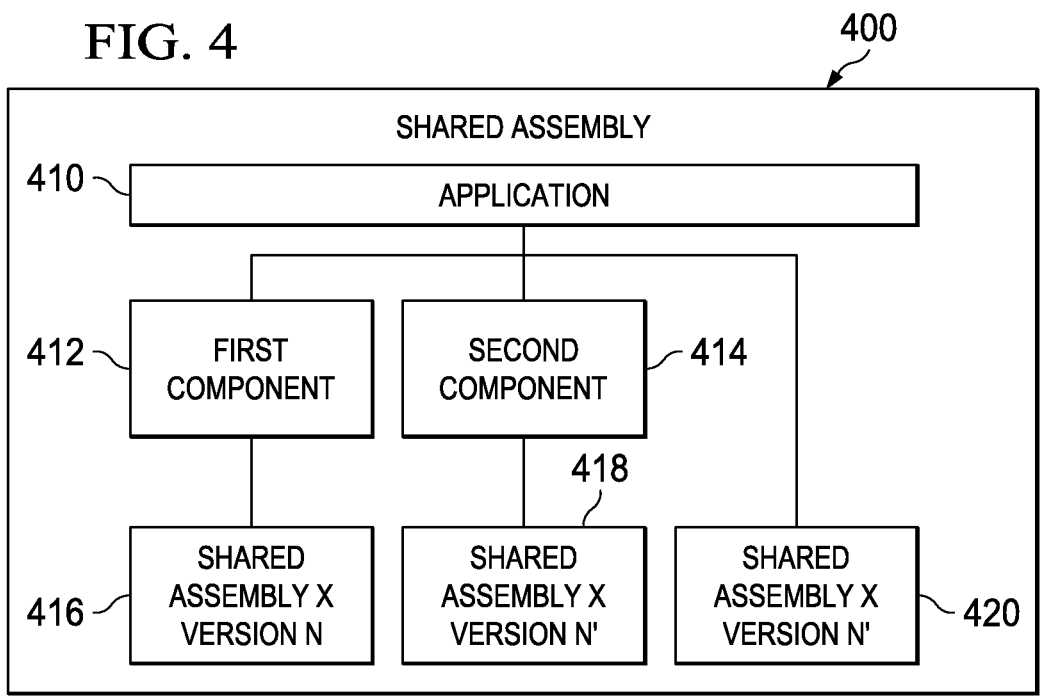

GUARANTEEING A SINGLE COPY OF A SHARED ASSEMBLY PER PROCESS

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for guaranteeing a single copy of a shared assembly per process in a UNIX environment.

2. Description of the Related Art

In a componentized environment a given application may be made up of many different components. Each of these components can have the same, similar, or completely different dependencies on other lower level components or assemblies. These kinds of dependencies can often result in complex and incompatible symbol resolutions within a UNIX process environment.

In a UNIX environment, once a symbol has been loaded into global space, that symbol becomes the unique definition utilized by the entire process for that symbol, regardless of any path or name of the shared assembly that the symbol resides in. Problems can occur when multiple instances of a shared assembly are drawn into the process.

If all of the instances of a shared assembly are at the same build level, then problems usually do not occur. However, in the situation where multiple distinct build levels, i.e., minor versions, of a shared assembly existing concurrently in a single process, maintaining configuration or installation procedures such that each component can each access the correct version of shared assembly for which they intend operate with becomes problematic.

SUMMARY OF THE INVENTION

A computer implemented method, computer program product, and a data processing system access a version of shared assembly in a componentized environment, wherein multiple versions of the shared assembly exist concurrently in a single process, and wherein each version of the shared assembly comprises an assembly stub and an assembly implementation. A call to an assembly stub of the shared assembly is received. The call is then forwarded from the assembly stub to an identified assembly implementation using a proxy pointer. A function table structure is then retuned from the identified assembly implementation, wherein the function table structure contains implementation symbols from the identified assembly implementation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a schematic diagram of multiple distinct build levels of a shared assembly existing concurrently in a single process according to the prior art;

FIG. 4 is a schematic diagram of multiple distinct build levels of a shared assembly existing concurrently in a single process but resolved locally according to the prior art;

DETAILED DESCRIPTION OF THE PREFERRED EMBODIMENT

Figure 1:
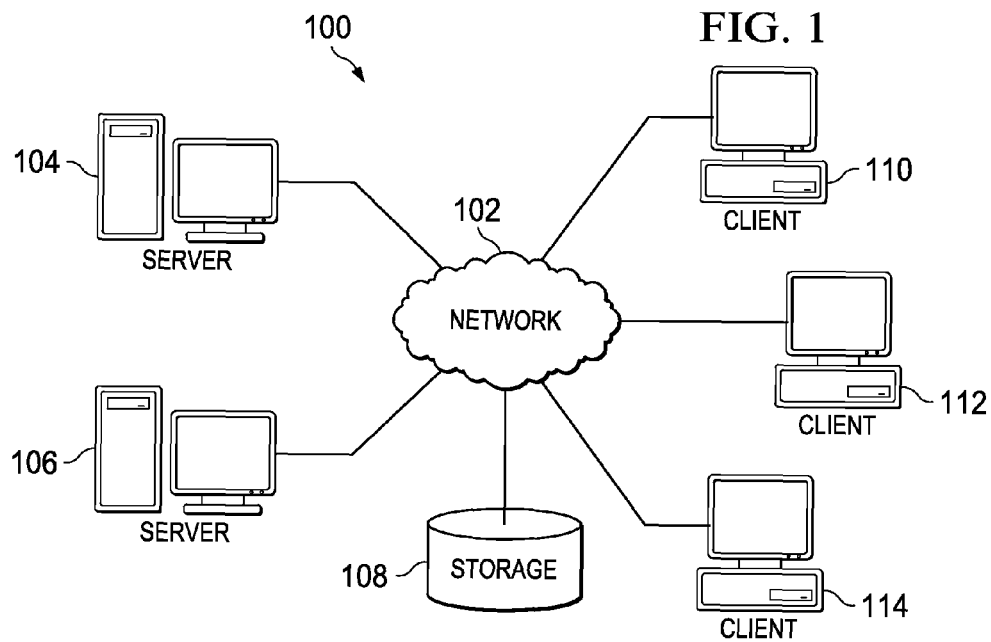
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
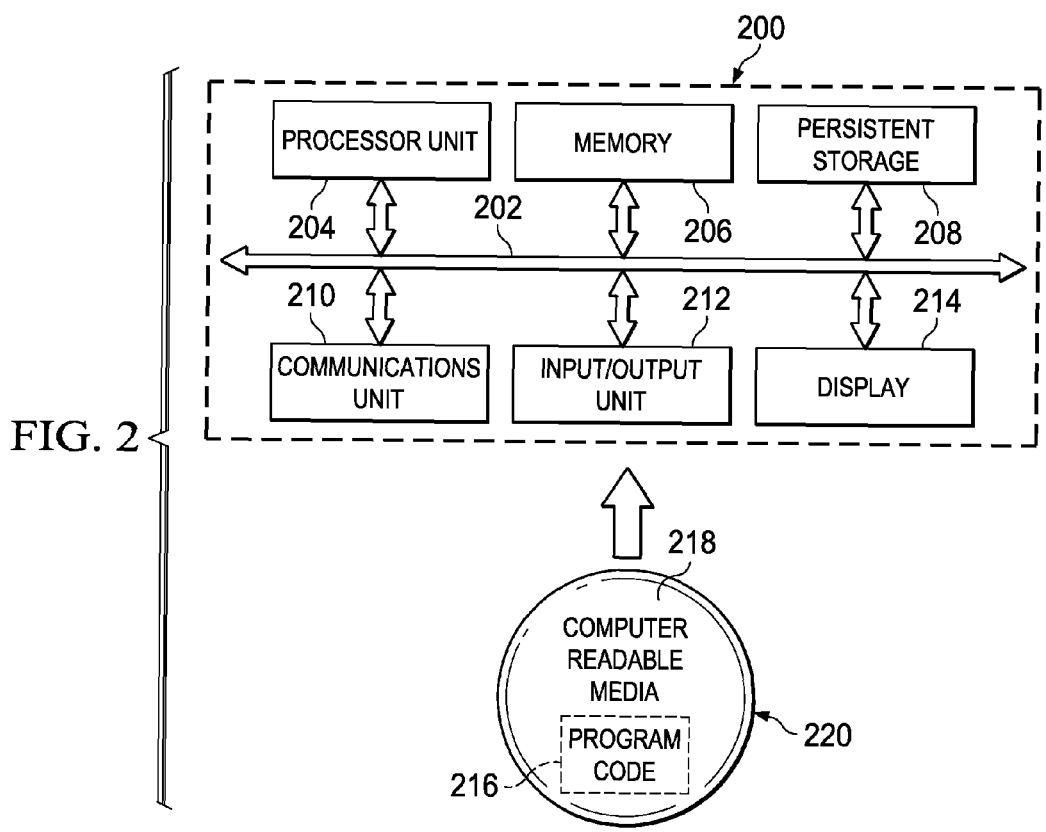
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments provide a computer implemented method, a data processing system, and a computer program product for ensuring that only a single unique and consistent instance of a given shared assembly exists in a process at any given time. An abstract virtual/proxy interface of the shared assembly is exposed to the consuming component, while the symbols that provide the specific version dependant implementation remain hidden. The implementation of the shared assembly is therefore split into two pieces, an assembly stub that exposes the API to the consumer and an assembly implementation one that implements the actual functionality. The assembly stub that exposes the application program interface acts as a pure virtual proxy, passing consumer calls down to the hidden symbols that contain the specific implementation.

Referring now to FIG. 3, a schematic diagram of multiple distinct build levels of a shared assembly existing concurrently in a single process are shown according to the prior art. Shared Assembly 300 is a software component executing on a data processing system, such as either client 110, 112, and 114 or server 104 of FIG. 1.

First component 312 accesses shared assembly version n 316. Second component 314 accesses shared assembly version n' 318. By installing multiple instances of the shared assembly on the system, application 310 ensures that the required configuration or installation procedures for both the first component 312 and the second component 314 are in place. Each of component 312 and component 314 can access the correct version of shared assembly for which they are intended to operate with.

Depending on the timing and method of symbol resolution, first component 312 may unwittingly resolve some symbols from shared assembly version n 316 and others from shared assembly version n' 318. The same problem can occur to second component 314. This mix-up in symbol resolution can result in very unexpected and unwanted behavior. The function X(n') may have functions that are dependant on all functions executed to this point being of X(n').

For example, consider that all X(n) functions of component 312 increment a global counter. This global counter is used later for garbage collection. Should a function from X(n') become inadvertently included, the global counter may not be incremented. Garbage collection may therefore occur while the object of interest is still in use.

Referring now to FIG. 4, a schematic diagram of multiple distinct build levels of a shared assembly existing concurrently in a single process but resolved locally are shown according to the prior art. Application 400 is a software component executing on a data processing system, such as either client 110, 112, and 114 or server 104 of FIG. 1. Shared Assembly 400 is a prior art solution to the problems of application 300.

Shared assembly 400 is an obvious solution to the problem illustrated with shared assembly 300 of FIG. 3. Shared assembly 400 is architected such that first component 412 only locally resolves to shared assembly X version n 416. Second component only locally resolves to shared assembly X version n' 418. With shared assembly architected in this exclusively local manner, each component only sees the version of the assembly that they require.

However, shared assembly 400 fails where application 410 requires the use of shared assembly X version n' 420. In the configuration above of shared assembly 400, the symbols loaded by application 410 from shared assembly X version n'

420 all take precedence over the symbols loaded by either first component 412 from shared assembly X version n 416 or second component 414 from shared assembly X version n' 418. This precedence occurs even though first component 412 and second component 414 are trying to resolve locally. In situations where application 410 is linked against, or explicitly loads shared assembly X version n' 420, unwanted behavior similar to that described in relation to FIG. 3 can occur. Shared assembly 400 may also fail where first component 412 and second component 414 come from competing uncooperative vendors who cannot agree to resolve symbols locally.

The illustrative embodiments expose an abstract virtual/proxy interface of the shared assembly to the consuming component while hiding the symbols that provide the specific version dependant implementation. The implementation of the shared assembly is split into two pieces. The first piece, the assembly stub, exposes the application program interface to the consumer. The second piece, the assembly implementation, implements the actual functionality of the shared assembly. The assembly stub that exposes the application program interface acts as a pure virtual proxy passing consumer calls down to the hidden symbols that contain the specific implementation.

A computer implemented method, computer program product, and a data processing system access a version of shared assembly in a componentized environment, wherein multiple versions of the shared assembly exist concurrently in a single process, and wherein each version of the shared assembly comprises an assembly stub and an assembly implementation. A call to an assembly stub of the shared assembly is received. The call is then forwarded from the assembly stub to an identified assembly implementation using a proxy pointer. A function table structure is then retuned from the identified assembly implementation, wherein the function table structure contains implementation symbols from the identified assembly implementation Referring now to FIG. 5, an assembly implementation for implementing the functionality of the shared assembly is shown according to an illustrative embodiment. The filename of each of assembly implementation release 510 and assembly implementation release 512 can be used to determine the namespace value of any symbols contained therein.

For each of assembly implementation release 510 and assembly implementation release 512, the exported symbols mySymbolA( ) 514, mySymbolB( ) 516, mySymbolA( ) 518, and mySymbolB( ) 520 are name spaced such that neither assembly implementation release 510 nor assembly implementation release 512 exports identical symbol names. These exclusive name spaced symbols can be achieved manually, via build time macros, and/or using C++ via namespaces.

Additionally, each of assembly implementation release 510 and assembly implementation release 512 only exports a single function symbol. That is, the single function symbol <namespace>::getSymbolTable( ) 522 is exported from assembly implementation release 510, and the single function symbol <namespace>::getSymbolTable( ) 524 is exported from assembly implementation release 512.

Figure 6:
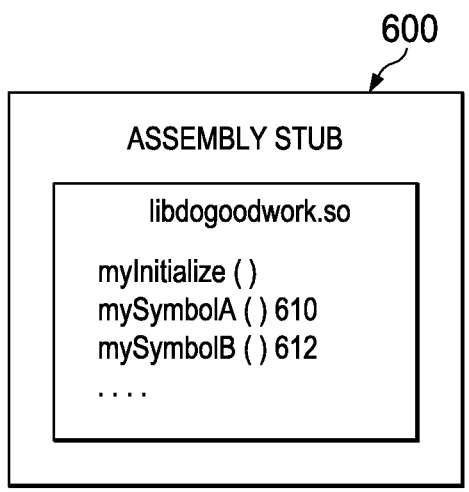
FIG. 6 is an assembly stub for exposing the application program interface to the consumer according to an illustrative embodiment.

Referring now to FIG. 6, an assembly stub for exposing the application program interface to the consumer is shown according to an illustrative embodiment. Assembly stub 600 is an assembly stub that exposes the application program interface, and acts as a pure virtual proxy passing consumer calls down to the hidden symbols within the assembly implementation that contain the specific implementation.

Assembly stub 600 exports the symbols mySymbolA( ) 610 and mySymbolB( ) 612. mySymbolA( ) 610 and mySymbolB( ) 612 are the view of the assembly application program interface that the consumer is permitted to consume. A consumer could view the assembly application program interface implicitly via, for example, but not limited to, a link against. Conversely, a consumer could view the assembly application program interface explicitly via, for example, but not limited to, a dlopen function. Assembly stub 600 remains backwards compatible at all times; therefore function symbols may be added to assembly stub 600 but never removed from assembly implementation 500 of FIG. 5.

Except for a special initialization function, each of exported symbols mySymbolA( ) 610 and mySymbolB( ) 612 performs no work. Instead, mySymbolA( ) 610 and mySymbolB( ) 612 of FIG. 6 simply pass the call down to assembly implementation 500 of FIG. 5 for performance by either mySymbolA( ) 514 and mySymbolB( ) 516 of assembly implementation release 510, or mySymbolA( ) 518 and mySymbolB( ) 520 of assembly implementation release 512.

Figure 5:
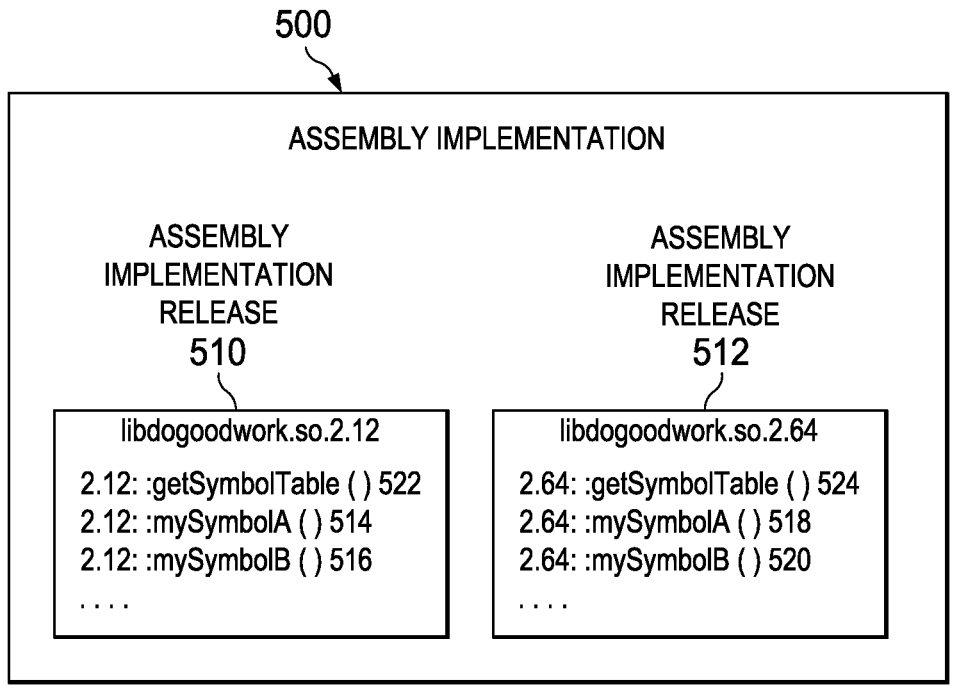
FIG. 5 is an assembly implementation for implementing the functionality of the shared assembly according to an illustrative embodiment.

In order to initialize assembly implementation 500 of FIG. 5 with assembly stub 600 of FIG. 6, the consumer calls a special initialization function to initialize the assembly prior to making any other call. In one illustrative embodiment, a standard shared assembly _init( ) function is used to provide the assembly initialization. The _init( ) function is called automatically by a loader when a shared assembly is first loaded into the process space. In an alternative illustrative embodiment, initialization is instead performed by each application program interface proxy separately. The program interface proxy function first checks if initialization has been performed on a particular assembly stub. If initialization has not been performed, application program interface proxy initializes the stub prior to any subsequent calls to that stub.

In addition to the initialization function the shared assembly also exports a global pointer initialized to zero. The pointer is the global symbol table pointer.

Assembly stub 600 is backwards compatible. That is, assembly stub 600 can grow to accommodate a new application program interface for a new assembly implementation, such as assembly implementation release 512 of FIG. 5, while maintaining a backwards compatible application program interface for an older assembly implementation, such as assembly implementation release 510 of FIG. 5.

For example, in one illustrative embodiment, assembly stub 600 may be an explicitly loaded, specific older version of assembly stub 600 that corresponds to an older version of the assembly implementation, such as assembly implementation release 510 of FIG. 5. In this illustrative embodiment, a newer version of the implementation assembly, such as assembly implementation release 512 may have more functions available than the explicitly loaded, specific older version of assembly stub 600.

If another consumer in the process loads a version of assembly stub 600 that corresponds to a newer version of the assembly implementation, such as assembly implementation release 512 of FIG. 5, application program interface symbols that are not present in the older assembly implementation, such as assembly implementation release 510 of FIG. 5, are not yet loaded. Therefore, the new application program interface symbols of the new assembly implementation, such as assembly implementation release 512 of FIG. 5, will be resolved into global space from the new version of assembly stub 600. When the second consumer makes a call to the newer application program interface of assembly stub 600, the new application program interface symbols are available. The newer version of assembly stub 600 knows about both the new application program interface and the function pointer symbols resolved into global space when the getSymbolTable( ) call was first made from the older version of assembly stub 600.

Figure 7:
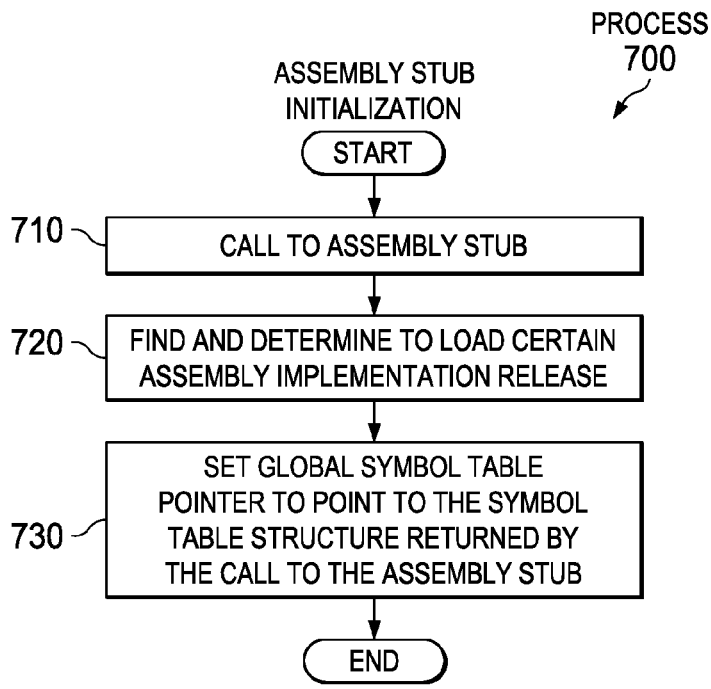
FIG. 7 is a flowchart of a sequence of events that occur during assembly stub initialization according to an illustrative embodiment of the present invention.

Referring now to FIG. 7, a flowchart of a sequence of events that occur during assembly stub initialization is shown according to an illustrative embodiment of the present invention. Data flow 700 shows the interaction between assembly implementation 500 of FIG. 5 and assembly stub 600 of FIG. 6.

Process 700 begins with a call to an assembly stub (step 710), such as myInitialize( ) of shared object library libdogoodwork.so. Shared object library libdogoodwork.so is an assembly stub such as assembly stub 600 of FIG. 6. Shared object library libdogoodwork.so exposes the application program interface and acts as a pure virtual proxy. Shared object library libdogoodwork.so passes consumer calls down to the hidden symbols that contain the specific implementation.

Process 700 then finds and determines to load a certain assembly implementation release (step 720). In an illustrative embodiment, myInitialize( ) finds and determines to load libdogoodwork.so.2.64. Process 700 can use a dlsym( ) command to resolve the address of the function getSymbolTable( ). Process 700 then calls this getSymbolTable( ) function to retrieve the symbol table structure.

Process 700 then sets a global symbol table pointer to point to the symbol table structure returned by the call to the assembly stub (step 730), with the process terminating thereafter. In an illustrative embodiment, the initialize function sets the global symbol table pointer to point to the symbol table structure returned by the 2.64::getSymbolTable( ) call.

Figure 8:
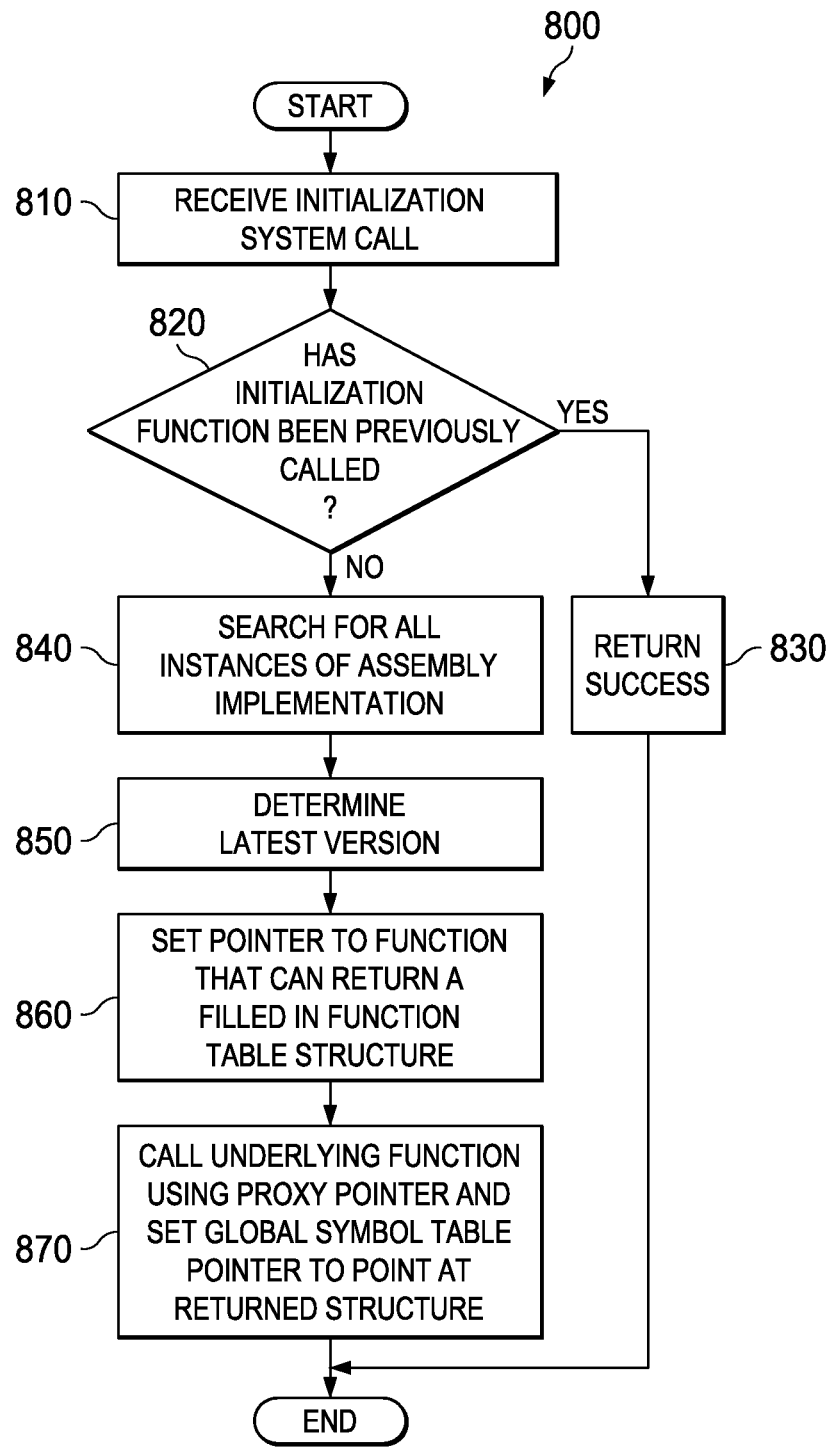
FIG. 8 is a detailed data flow for a sequence of events that occur during assembly stub initialization according to an illustrative embodiment of the present invention.

Referring now to FIG. 8, a detailed data flow for a sequence of events that occur during assembly stub initialization is shown according to an illustrative embodiment of the present invention. Process 800 is an illustrative embodiment of process 700.

Process 800 begins by receiving a call to an assembly stub (step 810), such as assembly stub 600 of FIG. 6. The shared object library exposes the application program interface and acts as a pure virtual proxy. The shared object library passes consumer calls down to the hidden symbols that contain the specific implementation.

Responsive to receiving the call to the assembly stub, process 800 determines whether the initialization function for the assembly stub has been previously called (step 820). In one illustrative embodiment, process 800 determines whether the assembly stub has been previously called by examining a global symbol table pointer. If the global symbol table pointer is NULL, the process 800 determines that this is the very first time the initialization function has been called. If the assembly stub has been previously called ("yes" at step 820), the symbol table pointer is not NULL then the initialization function returns success without doing anything else (step 830). Process 800 terminates thereafter.

Returning to step 820, if the assembly stub has not been previously called ("no" at step 820), and therefore the global symbol table pointer is NULL, process 800 then searches for all instances of the assembly implementation using the base name (step 840). In one illustrative embodiment within a Unix environment, process 800 uses the function LD_LIBRARY_PATH to search for all instances of the assembly implementation using the base name. In other operating systems, an equivalent function can be used. Each such search function should ignore any versioning part of the examined file names. For example, without limitation, a search of this type may return the files:

1. /usr/lib/libdogoodwork.so.2.12; and
2. /opt/myprog/libdogoodwork.so.2.64

Process 800 therefore not only ensures that a single instance is initialized, but also that the most recent instance is initialized. In the present illustrative embodiment within a Unix operating system, the single, most recent instance is /opt/myprog/libdogoodwork.so.2.64.

Process 800 then loads the identified assembly implementation (step 850). In one illustrative embodiment within a Unix environment, process 800 utilizes a dlopen( ) function to load the chosen assembly implementation.

Process 800 then sets a pointer to the function that can return a filled in function table structure for the real implementation symbols (step 860). In the present illustrative embodiment within a Unix operating system, a dlsym( ) function is used to get the pointer to the function that can return a filled in function table structure for the real implementation symbols. The names are exported to the initialization function in the form <namespace><base function name>. Therefore, the initialization function can determine the namespace from the assembly implementation filename and look up this symbol. For example in this case it knows that to get the function pointer for getSymbolTable( ) it needs to pass dlsym( ) the lookup string "2.64::getSymbolTable".

Process 800 then makes a call to the underlying function using the proxy pointer and sets the global symbol table pointer to point at the returned structure (step 870), with the process terminating thereafter. In the present illustrative example, process 800 makes a call to getSymbolTable( ) via the function pointer. Any subsequent assembly stub function calls will later use the function pointer to find their real implementations.

After initialization of the assembly stub is complete, when a consuming application makes a call to an assembly stub function, the global symbol table pointer is used to look up the function address for the real implementation in the internal symbol table. The call is then passed through to the real implementation. Continuing with the present illustrative embodiment, by way of a non-limiting example, an application calls function mySymbolA( ). The application first calls the assembly stub mySymbolA( ). The assembly stub mySymbolA( ) then uses the global symbol table pointer to look up the function pointer and makes a call to the assembly implementation 2.64::mySymbolA( ).

Figure 9:
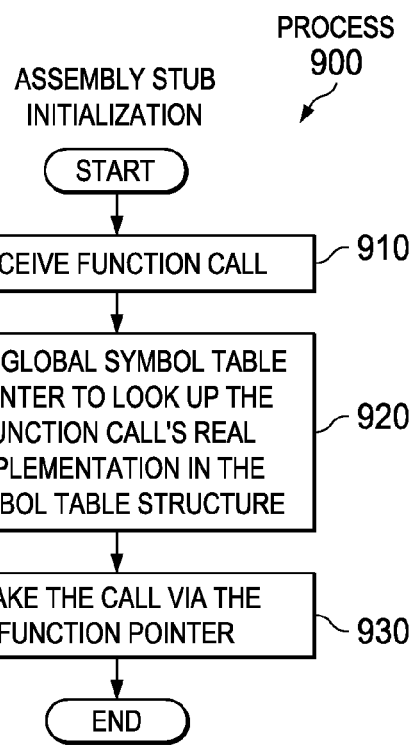
FIG. 9 is a flowchart of the processing steps for making a function call according to an illustrative embodiment.

Referring now to FIG. 9, a flowchart of the processing steps for making a function call is shown according to an illustrative embodiment. Process 900 is a software process, executing on a software component, such as Application 310 of FIG. 3.

Process 900 begins by receiving a function call (step 910). In the illustrative embodiment, process 900 calls the function mySymbolA( ).

Process 900 then uses the global symbol table pointer to look up the function call's real implementation in the symbol table structure (step 920).

Responsive to looking up the real implementation, process 900 makes the call via the function pointer (step 930), with the process terminating thereafter. In the illustrative embodiment, process 900 calls the function 2.64::mySymbolA( ).

Thus the illustrative embodiments provide a computer implemented method, a data processing system, and a computer program product for ensuring that only a single unique and consistent instance of a given shared assembly exists in a process at any given time. An abstract virtual/proxy interface of the shared assembly is exposed to the consuming component, while the symbols that provide the specific version dependant implementation remain hidden. The implementation of the shared assembly is therefore split into two pieces, an assembly stub that exposes the API to the consumer and an assembly implementation one that implements the actual functionality. The assembly stub that exposes the application program interface acts as a pure virtual proxy, passing consumer calls down to the hidden symbols that contain the specific implementation.

A computer implemented method, computer program product, and a data processing system access a version of shared assembly in a componentized environment, wherein multiple versions of the shared assembly exist concurrently in a single process, and wherein each version of the shared assembly comprises an assembly stub and an assembly implementation. A call to an assembly stub of the shared assembly is received. The call is then forwarded from the assembly stub to an identified assembly implementation using a proxy pointer. A function table structure is then retuned from the identified assembly implementation, wherein the function table structure contains implementation symbols from the identified assembly implementation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for accessing a version of shared assembly in a componentized environment, the computer implemented method comprising:
   receiving a call to an assembly stub of the shared assembly, wherein multiple versions of the shared assembly exist concurrently in a single process, wherein each of the multiple versions of the shared assembly comprises an assembly stub and an assembly implementation;
   forwarding the call from the assembly stub to an identified assembly implementation using a proxy pointer and setting a global symbol table pointer to point at a returned function table structure;
   returning the function table structure from the identified assembly implementation, wherein the function table structure contains implementation symbols from the identified assembly implementation, wherein an implementation symbol becomes a unique definition utilized by an entirety of the single process when the implementation symbol is loaded into global space, regardless of any path or name of the shared assembly that the implementation symbol resides in.

2. The computer implemented method of claim 1 further comprising:
responsive to receiving the call to the assembly stub, determining whether an initialization function for the assembly stub has been previously called;
responsive to determining that the assembly stub has not been previously called, identifying at least one instance of the assembly implementation;
responsive to identifying the at least one instance of the assembly implementation, identifying the identified assembly implementation;
responsive to identifying the identified assembly implementation, loading the identified assembly implementation.

3. The computer implemented method of claim 2 further comprising:
responsive to loading the identified assembly implementation, setting the proxy pointer to the identified assembly implementation.

4. The computer implemented method of claim 2, wherein the step of identifying at least one instance of the assembly implementation further comprises:
identifying at least one instance of the assembly implementation using a same base name to identify the at least one instance of the assembly implementation.

5. The computer implemented method of claim 1, wherein the step of identifying an identified assembly implementation further comprises:
identifying an identified assembly implementation, wherein the identified assembly implementation is a most recent instance of the assembly implementation.

6. The computer implemented method of claim 1, wherein the shared assembly is a shared object library within a componentized process environment.

7. The computer implemented method of claim 1, wherein the shared assembly is a pure virtual proxy that passes the call from the assembly stub to the identified assembly implementation.

8. A computer program product comprising:
a non-tangible computer readable medium having a computer usable program code for accessing a version of shared assembly in a componentized environment, the computer program product comprising:
computer usable program code for receiving a call to an assembly stub of the shared assembly, wherein multiple versions of the shared assembly exist concurrently in a single process, wherein each version of the shared assembly comprises an assembly stub and an assembly implementation;
computer usable program code for forwarding the call from the assembly stub to an identified assembly implementation using a proxy pointer and setting a global symbol table pointer to point at a returned function table structure;
computer usable program code for returning the function table structure from the identified assembly implementation, wherein the function table structure contains implementation symbols from the identified assembly implementation, wherein an implementation symbol becomes a unique definition utilized by an entirety of the single process when the implementation symbol is loaded into global space, regardless of any path or name of the shared assembly that the implementation symbol resides in.

9. The computer program product of claim 8 further comprising:
computer usable program code, responsive to receiving the call to the assembly stub, for determining whether an initialization function for the assembly stub has been previously called;
computer usable program code, responsive to determining that the assembly stub has not been previously called, for identifying at least one instance of the assembly implementation;
computer usable program code, responsive to identifying the at least one instance of the assembly implementation, for identifying the identified assembly implementation;
computer usable program code, responsive to identifying the identified assembly implementation, for loading the identified assembly implementation.

10. The computer program product of claim 9 further comprising:
computer usable program code, responsive to loading the identified assembly implementation, for setting the proxy pointer to the identified assembly implementation.

11. The computer program product of claim 9, wherein the step of identifying at least one instance of the assembly implementation further comprises:
computer usable program code for identifying at least one instance of the assembly implementation using a same base name to identify the at least one instance of the assembly implementation.

12. The computer program product of claim 8, wherein the step of identifying an identified assembly implementation further comprises:
computer usable program code for identifying an identified assembly implementation, wherein the identified assembly implementation is a most recent instance of the assembly implementation.

13. The computer program product of claim 8, wherein the shared assembly is a shared object library within a componentized process environment.

14. The computer program product of claim 8, wherein the shared assembly is a pure virtual proxy that passes the call from the assembly stub to the identified assembly implementation.

15. A data processing system for accessing a version of shared assembly in a componentized environment, the data processing system comprising:
a bus;
a storage device connected to the bus, wherein the storage device contains a computer usable code; and
a processing unit connected to the bus, wherein the processing unit executes the computer usable program code to receive a call to an assembly stub of the shared assembly, wherein multiple versions of the shared assembly exist concurrently in a single process, wherein each version of the shared assembly comprises an assembly stub and an assembly implementation, to forward the call from the assembly stub to an identified assembly implementation using a proxy pointer and to set a global symbol table pointer to point at a returned function table structure, and to return the function table structure from the identified assembly implementation, wherein the function table structure contains implementation symbols from the identified assembly implementation, wherein an implementation symbol becomes a unique definition utilized by an entirety of the single process when the implementation symbol is loaded into global space, regardless of any path or name of the shared assembly that the implementation symbol resides in.

16. The data processing system of claim 15, wherein the processing unit further executes the computer usable program code, responsive to receiving the call to the assembly stub, to determine whether an initialization function for the assembly stub has been previously called, responsive to determining that the assembly stub has not been previously called, to identify at least one instance of the assembly implementation, responsive to identifying the at least one instance of the assembly implementation, to identify the identified assembly implementation, and responsive to identifying the identified assembly implementation, to load the identified assembly implementation.

17. The data processing system of claim 16, wherein the processing unit further executes the computer usable program code, responsive to loading the identified assembly implementation, to set the proxy pointer to the identified assembly implementation.

18. The data processing system of claim 16, wherein the processing unit executing the computer usable program code to identify at least one instance of the assembly implementation further comprises:

executing the computer usable program code to identify at least one instance of the assembly implementation using a same base name to identify the at least one instance of the assembly implementation.

19. The data processing system of claim 15, wherein the processing unit executing the computer usable program code to identify an identified assembly implementation further comprises:

executing the computer usable program code to identify an identified assembly implementation, wherein the identified assembly implementation is a most recent instance of the assembly implementation.

20. The data processing system of claim 15, wherein the shared assembly is a shared object library within a componentized process environment.

\* \* \* \* \*